No. 887,100. PATENTED MAY 12, 1908.
L. T. KNOWLES.
JOINTED WHEEL TREAD.
APPLICATION FILED NOV. 29, 1907.

Witnesses.
A. H. Opsahl.
Malie Hoel.

Inventor.
Louis T. Knowles
By his Attorneys.
Williamson & Merchant

UNITED STATES PATENT OFFICE.

LOUIS T. KNOWLES, OF MINNEAPOLIS, MINNESOTA.

JOINTED WHEEL-TREAD.

No. 887,100.  Specification of Letters Patent.  Patented May 12, 1908.

Application filed November 29, 1907. Serial No. 404,383.

*To all whom it may concern:*

Be it known that I, LOUIS T. KNOWLES, a citizen of the United States, residing at Minneapolis, in the county of Hennepin and State of Minnesota, have invented certain new and useful Improvements in Jointed Wheel-Treads; and I do hereby declare the following to be a full, clear, and exact description of the invention, such as will enable others skilled in the art to which it appertains to make and use the same.

My invention relates to vehicle wheels and has for its object to provide an improved tread therefor whereby the draft of the vehicle is reduced and the wheel is better adapted to run over soft and sandy roads.

To the above ends the invention consists of the novel devices and combinations of devices hereinafter described and defined in the claims.

In the accompanying drawings which illustrate the invention, like characters indicate like parts throughout the several views.

Figure 1:
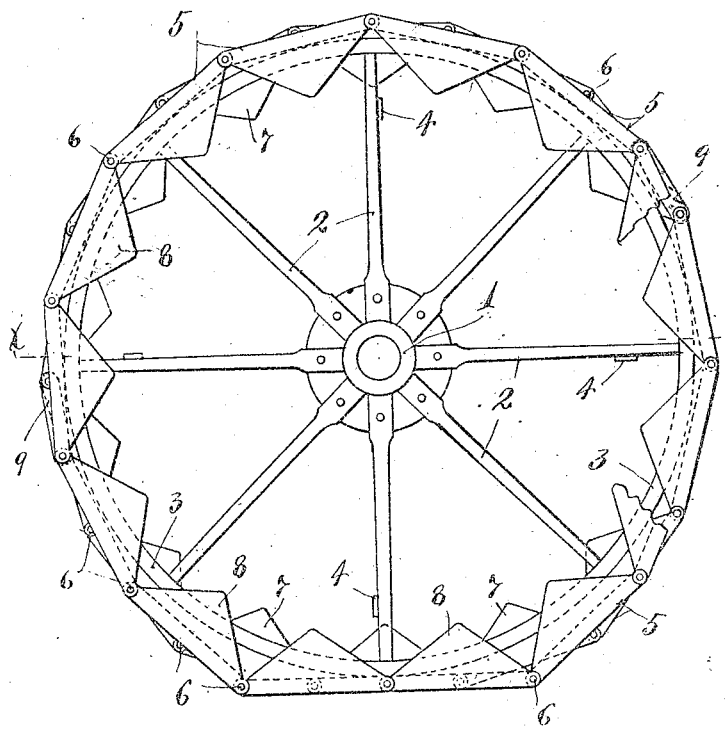
Figure 2:
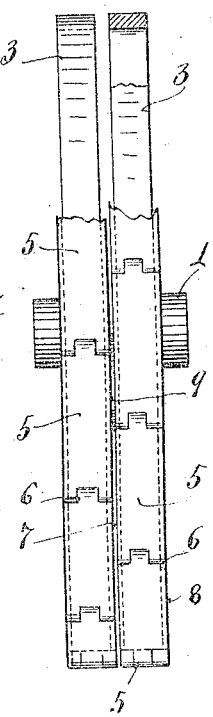
Figure 3:
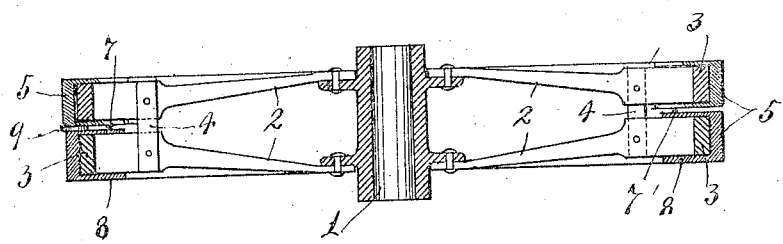

Referring to the drawings, Figure 1 is a view in side elevation, showing the wheel provided with the improved tread. Fig. 2 is a view of the wheel in edge elevation, with some parts broken away and some parts sectioned; and Fig. 3 is a horizontal section taken on the line x—x of Fig. 1.

The wheel, which may be made in various sizes and designs, as shown comprises a hub 1, radial spokes 2 and a pair of concentric laterally spaced rims 3, which parts are rigidly connected. The spokes 2 are arranged in laterally spaced pairs and, as shown, are tied together near their outer extremities, but a considerable distance inward from the rims 3, by metal tie plates 4 shown as riveted thereto. Each rim 3 is provided with a loosely mounted sectional tread made up of quite long and flat links 5, connected by hinged joints 6, much in the manner of a link belt chain. The links 5 are provided with inside and outside flanges 7 and 8, respectively, that embrace the respective rims 3, and the former of which work in the space between the two rims 3. The outside flanges 8, while not absolutely necessary, are desirable as they very greatly assist in holding the links or tread sections 5 in proper working positions on the respective wheel rims.

There must be sufficient slack in the two chain-like treads to permit the two lower tread sections to occupy alined or horizontal positions, as shown in Fig. 1. Furthermore, the links or sections of the one tread must be staggered or offset circumferentially of the wheel, so that their joints lap; and, to maintain the two treads in such relative adjustment, certain of the sections of the two treads are flexibly connected by several, as shown two, thin links 9 pivotally attached to the inner flanges 7 of the adjacent sections of the two treads.

The joints of the two treads are lapped or offset as above stated, so that the lower link or section of one of the treads will always overlap the pivot joint of the two links or sections of the other tread which are turned into horizontal or flat positions, as shown in Fig. 1. This very greatly increases the ability of the complete wheel tread to withstand sinking into soft ground. Otherwise stated, the wheel always rests upon the intermediate portion of some one of the tread sections and never entirely upon the joint between the tread sections.

The wheel above described has been found efficient in actual practice. It is capable of large range of modification and of variation in use ranging from wheel-barrows to automobiles and heavy trucks. It is especially adapted for the latter use.

What I claim is:

1. The combination with a wheel having a divided or split rigid rim, of a pair of jointed sectional treads working on said wheel rim with slack or play, and means holding said treads with their joints circumferentially offset or lapped, substantially as described.

2. The combination with a wheel having laterally spaced concentric rigid rims, of a pair of jointed sectional treads working on said rims and having retaining flanges working between said rims, and at least one link yieldingly connecting said two treads and holding the same with their joints circumferentially offset or lapped, substantially as described.

In testimony whereof I affix my signature in presence of two witnesses.

LOUIS T. KNOWLES.

Witnesses:
M. E. RONEY,
H. D. KILGORE.